United States Patent [19]

Yan

[11] 4,218,427

[45] Aug. 19, 1980

[54] METHOD FOR $NO_x$ REMOVAL FROM STACK GASES

[75] Inventor: Tsoung Y. Yan, Philadelphia, Pa.

[73] Assignee: Mobil Oil Corporation, New York, N.Y.

[21] Appl. No.: 32,207

[22] Filed: Apr. 23, 1979

[51] Int. Cl.² .............................................. B01D 53/34
[52] U.S. Cl. ..................................... 423/239; 423/351
[58] Field of Search ................ 423/239, 351; 110/344, 110/345

[56] References Cited

U.S. PATENT DOCUMENTS

| | | | |
|---|---|---|---|
| 4,041,141 | 8/1977 | Moss | 423/569 |
| 4,060,589 | 11/1977 | Hass et al. | 423/239 X |

FOREIGN PATENT DOCUMENTS

| | | | |
|---|---|---|---|
| 532851 | 11/1956 | Canada | 423/351 |
| 1222901 | 8/1966 | Fed. Rep. of Germany | 423/239 |
| 223794 | 11/1968 | U.S.S.R. | 423/239 |

*Primary Examiner*—G. O. Peters
*Attorney, Agent, or Firm*—Charles A. Huggett; Raymond W. Barclay

[57] ABSTRACT

A method for reducing $NO_x$ in stack gases is disclosed which comprises contacting stack gas with a fluidized bed of pulverized coal at a temperature within the range from about 400°–700° C., passing the gaseous effluent from the fluidized bed reactor to a heat recovery unit to complete the combustion of volatiles evolved in the fluidized bed reactor and to recover the heat content of the treated stack gas, and then discharging the treated gas to the atmosphere. In a preferred embodiment of the method of this invention, the treated gases passing from the heat recovery unit are subjected to a sulfur compound removal step before being discharged to the atmosphere.

14 Claims, 1 Drawing Figure

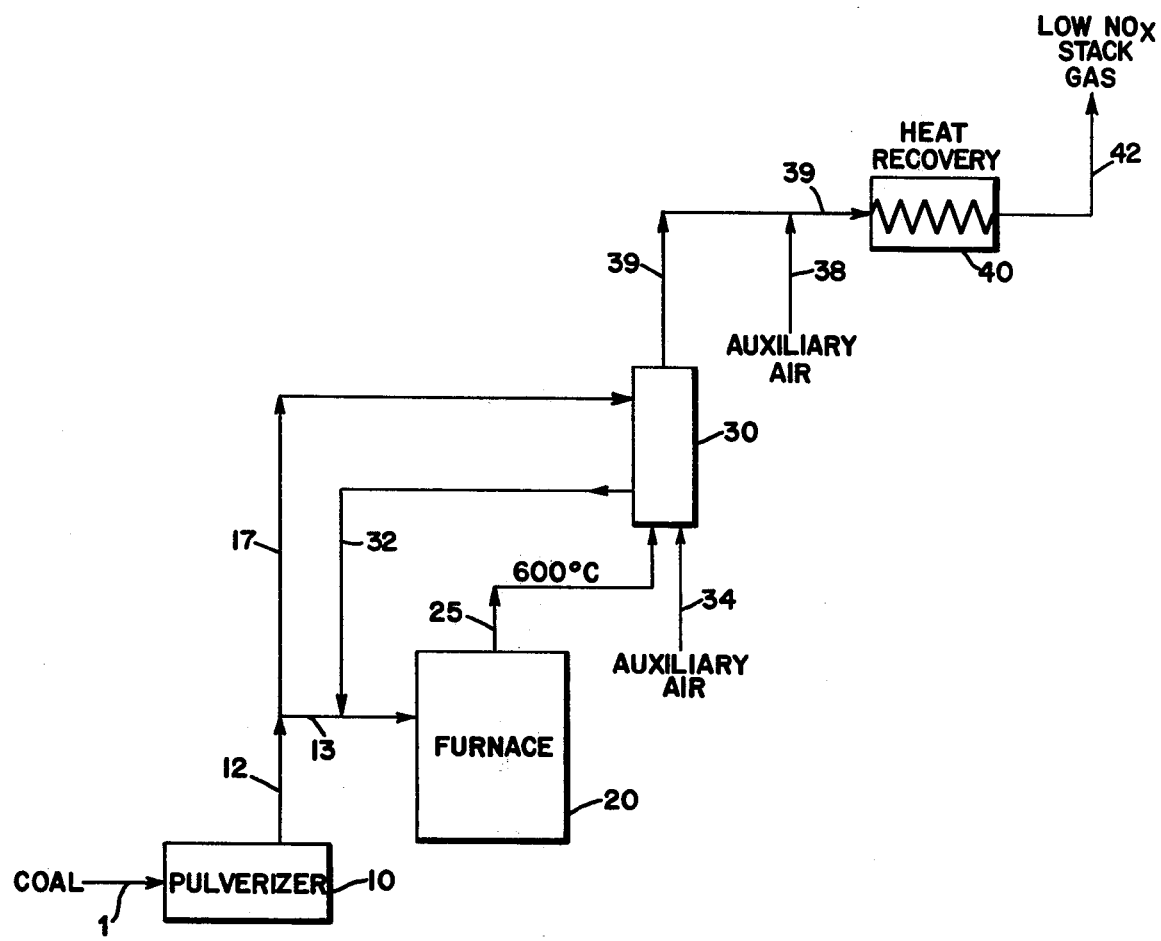

METHOD FOR NO$_x$ REMOVAL FROM STACK GASES

BACKGROUND OF THE INVENTION

1. Field of the Invention

This invention is concerned with the removal of atmospheric pollutants from gas streams. This invention is more particularly concerned with a method for the removal of NO$_x$ compounds from gas streams, especially from stack gases emitted from stationary combustion sources wherein nitrogen oxides are reduced to form nitrogen gases which are subsequently emitted to the atmosphere.

2. Description of the Prior Art

The Clean Air Act of 1970 directs the Administrator of the Environmental Protection Agency to promulgate national ambient air quality standards for those pollutants "which in his judgment have an adverse effect on public health and welfare." Furthermore, the Clean Air Act directs the Administrator of the Environmental Protection Agency to promulgate standards of performance with respect to the emission of air pollutants for those new stationary sources which he determines "may contribute significantly to air pollution which causes or contributes to the endangerment of public health or welfare." Nitrogen oxides (referred to herein as "NO$_x$", which is meant to include nitric oxide and nitrogen dioxide as well as other compounds of nitrogen and oxygen which are of less significance in the atmosphere) have been identified as air pollutants having an adverse effect on public health and welfare. Accordingly, ambient air quality standards for NO$_x$ and new source standards for various facilities such as steam generators, nitric acid plants and gas turbines have been promulgated.

In order to minimize NO$_x$ emissions from stationary combustion sources, burner design is being modified and operating conditions are being controlled. However, these measures cannot remove NO$_x$ to the low level required by EPA standards. NO$_x$ emission is particularly high for coal burning furnaces. It is known that NO$_x$ emission is related to the nitrogen content of the fuel: the higher the nitrogen content of the fuel, the higher the NO$_x$ content in the stack gas. However, denitrogenation of fuel is difficult, particularly for heavy oil and solid fuels. Furthermore, much of the NO$_x$ is derived from the nitrogen fixation reaction which is dependent on the design and operation of the furnace.

Current approaches to NO$_x$ removal from stack gases emitted by stationary combustion sources may be generally characterized as either dry contact reduction processes or wet absorption processes. An example of the former characterization is the absorption of nitrogen oxides by water or alkali solutions. These methods require large and expensive equipment such as absorption towers to treat a large volume of waste gases. Moreover, these methods are not economically effective when the NO$_x$ concentration in waste gases is 200 ppm or less.

Dry contact reduction processes may be either catalytic or non-catalytic and may be either selective or non-selective. Selective reduction methods are characterized by the selective reduction of nitrogen oxides and their consequent removal in the presence of oxygen. A known selective reduction method uses ammonia as a reducing agent. However, the ammonia reducing agent oxidizes to form nitrogen oxide at high temperatures and excessive ammonia discharged to the atmosphere is itself another source of air pollution. Other selective reduction methods employ catalysts to enhance the production of desired reduction products. For example, U.S. Pat. No. 4,016,241 suggests adding a reducing agent which is a C$_2$-C$_6$ olefin or an aromatic hydrocarbon to stack gas and contracting the mixture at 200°-450° C. with a catalyst comprising iridium on a refractory carrier.

However, catalytic reduction processes generally have reduced effectiveness because of the presence of particulates, sulfurous acid gases and other poisons in stack gas to be treated which reduce catalyst life and thereby increase process costs.

Non-selective reduction methods generally comprise adding a reducing agent to the NO$_x$ containing gases, consuming all free oxygen present in the gases through combustion of a portion of the reducing agent, and reducing the NO$_x$ to nitrogen by the remaining reducing agent. The reduction usually occurs in the presence of a catalyst. Carbon monoxide, natural gas, methane, butane, propane, purge gas from ammonia plants, naphtha and hydrogen have been employed as reducing agents. The scarcity and expense of these reducing agents has hindered wide-spread acceptance of this type of method for NO$_x$ control.

U.S. Pat. No. 3,864,450 discloses a process wherein NO$_x$ present in gaseous mixtures is reduced at temperatures between about 250° C. and 480° C. by contact with carbon-containing NaOH and/or KOH. Carbon used in the catalyst includes coke, semi-coke, and coal; coke, semi-coke and petroleum coke are suggested as the most suitable material.

U.S. Pat. No. 3,873,671 discloses a process wherein effluent gases are treated for NO$_x$ reduction by introducing the effluent gases to a burning fuel containing a hydrocarbon or hydrogen, maintaining the treatment zone at a temperature between 1200° and 2000° F. (650°-1095° C.) to reduce substantially all of the NO$_x$ and thereafter contacting the NO$_x$-reduced mixture in a separate zone to convert remaining oxidizable combustion products to CO$_2$ and H$_2$O without reformation of NO$_x$. Coal is disclosed as a fuel at column 4, lines 16-22.

U.S. Pat. No. 4,060,589 discloses a process for reducing NO$_x$ (and/or SO$_x$) components in stack gas by passing stack gas at 900°-1600° F. (480°-870° C.) over coal, coke or char obtained from coal gasification plants. The '589 patent does not suggest adding oxygen to the stack gas to be treated but does show that the stack gas contains from 0-25 percent oxygen (see Table I in column 2) and suggests that this oxygen content is important in maintaining the temperature of the reaction zone (see column 3, lines 1-45). The patent further suggests that treated gas may be post treated over a cobalt-molybdate catalyst by a known process to remove H$_2$S (see column 4, line 41 to column 5, line 33). The bed of carbonaceous material in the primary treatment step may be either fixed or of the moving bed type (column 7, line 62, et seq.). The use of coal as a carbonaceous material—particularly anthracite coal—is suggested in the first full paragraph of column 8. In one embodiment of the process, a portion of the coal normally used in the fuel combustion or conversion plant is carbonized and employed as a carbonaceous material in the stack treatment zone (column 8, lines 36-55).

U.S. Pat. No. 3,867,507 teaches a method for controlling $NO_x$ emissions by a thermally-activated, gas-phase chemical reaction wherein an $NO_x$-containing combustion effluent or waste product stream is first contacted with a hydrocarbon in the presence of oxygen at a temperature ranging from 400° to 2700° C. for a sufficient time to substantially reduce the $NO_x$ to molecular nitrogen and then contacting the reduced stream with oxygen at a temperature ranging from 400°–2700° C. for a sufficient time to substantially oxidize all remaining contaminants. Hydrocarbon and oxygen (air) are added to the $NO_x$-containing combustion effluent or waste product stream in an amount sufficient to maintain supply from 0.02 to 32 carbon atoms per molecule of $NO_x$ and less than 2.5 oxygen molecules per carbon atom. Contrasting this process from that disclosed in U.S. Pat. No. 3,873,671 described above, it should be noted that the '671 patent is essentially an "after burning" method in which another small flame is actually maintained downstream of the primary flame by injecting fuel and burning it in order to incinerate contaminating gases.

A primary object of the present invention is an improved non-selective, non-catalytic, dry contact reduction method for the removal of nitrogen oxides from $NO_x$-containing gases. A related object is a method for controlling $NO_x$ emissions which method is compatible with the removal and control of other pullutants such as sulfur-containing gases and products of incomplete combustion.

A further object of this invention is a dry contact reduction method for the removal of nitrogen oxide from waste gases which uses inexpensive, readily available materials.

A still further object of this invention is a low-cost process for the removal and disposal of $NO_x$ from large volumes of diluent gases such as stack gases from coal fired boilers or power plants.

SUMMARY OF THE INVENTION

Although it has been suggested that $NO_x$ and/or $SO_x$ components in stack gases may be reduced by passing the stack gas over a fixed bed of coal at temperatures in excess of 900° F. (see U.S. Pat. No. 4,060,589), the carbon-steam reaction has been thought to be necessary to produce carbon monoxide and hydrogen reducing agents which react with the $NO_x$ and $SO_x$ pollutants to form nitrogen and hydrogen sulfide. The use of coals other than anthracite coal—i.e., the use of high- or medium-volatile coals was thought undesirable because their use to process stack gases containing oxygen was believed to cause fusion of the coals into large aggregates which are difficult to process as a moving bed and are difficult to remove from a stationary-bed reactor. Moreover, the production of volatiles such as phenols and benzene from lower rank coal than anthracite was regarded as a serious obstacle to the use of coals other than anthracite in dry-contact reduction methods for the removal of nitrogen oxide from stack gases.

Briefly, the present invention provides a method for treating a combustion effluent stream or waste product stream containing $NO_x$ and other contaminants which comprises contacting said streams with a fluidized bed of coal at a temperature within the range from about 400°–700° C. for a sufficient time to substantially reduce the $NO_x$ to molecular nitrogen and then contacting the reduced stream with sufficient oxygen to oxidize the hydrocarbons, carbon monoxide, and other oxidizable contaminants present therein to less objectionable products. Sulfur contaminants which are present in the oxidized stream as $SO_2$ may be removed by conventional techniques before discharging the gaseous stream to the atmosphere.

The hydrocarbons and substituted hydrocarbons devolatized from the coal are highly effective gas-phase reducing agents for $NO_x$. A small quantity of air is added to the reduction zone to improve the reaction rate and to maintain reaction temperature. The presence of oxygen in the fluidized bed reduction zone also serves to control the agglomerating tendency of coal.

BRIEF DESCRIPTION OF THE DRAWING

The FIGURE is a schematic drawing of a preferred embodiment of the method of this invention.

DETAILED DESCRIPTION OF THE INVENTION

The coal employed in the method of this invention includes carbonaceous material having at least about 15 weight percent volatile matter. Thus, all types of bituminous and sub-bituminous coals, lignite and peat may be employed as "coal" in the process of this invention. Table I below shows the volatile matter of selected coals of various ranks, some of which are not suitable for use in the process of this invention.

| Volatile Matter of Selected Coals of Various Ranks | | | |
|---|---|---|---|
| Rank | State | Seam | Volatile Matter |
| Anthracite | Pennsylvania | Biylykens | 7.5 |
| Anthracite | Pennsylvania | Mammoth | 3.1 |
| Semianthracite | Virginia | Merrimac | 12.4 |
| Low-Volatile Bituminous | West Va. | Pocahantas #3 | 18.2 |
| High-Volatile C Bituminous | Illinois | No. 2 | 40.2 |
| Medium-Volatile | West Va. | Sewell | 25.0 |
| Subbituminouo B | Wyoming | Monarch | 33.3 |
| Lignite | North Dakota | Beulah | 28.2 |

The degree of coal pulverization is not critical and the practices at typical coal pulverized furnaces are acceptable. When $NO_x$-containing gas to be treated by the process is generated by a coal-fired stationary combustion source, the pulverized coal employed in the fluidized-bed reduction zone desirably is a split stream of the main stream of coal being fed to the combustion source. Depending on the nature of the coal, the size of the split stream is about 0.01 to 5% of the total coal fed to the source.

A typical stack gas will contain the following components in the indicated range of molar percentages:

TABLE II

| Component | Mol % |
|---|---|
| $O_2$ | 0–5 |
| CO | 0–0.5 |
| $CO_2$ | 10–20 |
| NO | 0–0.2 |
| $H_2O$ | 5–25 |
| $SO_2$ | 0–1.0 |
| $N_2$ | 70–75 |
| $SO_3$ | 0–0.013 |

According to the method of this invention, stack gas or other $NO_x$-containing waste gas streams are contacted with a fluidized bed of coal for a sufficient time to substantially reduce the $NO_x$ to molecular nitrogen.

The temperature of the reduction zone ranges broadly between the coal devolatilization temperature and the ash fusion temperature of the coal. Preferably the temperature is within the range from about 400°–700° C. More preferably, the temperature is within the range from about 500°–650° C.

Although the reactions occurring in the reduction zone of the method of this invention are complex, it is believed that under the conditions employed, the coal devolatilizes to yield carbon-containing free radicals which are highly effective reducing agents. Gasification reactions such as the steam-carbon reaction, the carbon dioxide-carbon reaction, and oxidative gasification can also be expected to occur in varying degrees in the reduction zone, forming additional reducing components. Individually, these reactions may be expressed as follows:

(1) $Coal \xrightarrow{Heat} CH_3 + Char + Other\ Coal\ Volatiles$ (2) $C + H_2O \rightarrow CO + H_2$ (3) $C + CO_2 \rightarrow 2CO$ (4) $C + O_2 \rightarrow CO_2$ The reducing components formed by the aforementioned reactions then react with $NO_x$ to form nitrogen, steam, and carbon oxides.

While not wishing to be bound by any theory of operability, it is believed that the reducing components of the process of this invention comprise the normally gaseous portion of coal volatiles. More specifically, it is believed that the reducing components comprise normally gaseous lower hydrocarbons (e.g., methane, ethane, and the free radicals formed therefrom) carbon monoxide, and hydrogen devolatilized from the coal. An important operating parameter of the method of this invention is the number of moles of these reducing components supplied by the coal feed per mole of $NO_x$ present in the stack gas. Generally, this ratio, designated herein as $[V_r]/[NO_x]$, should be within the range from about 1 to 100. Preferably, it should range from 5 to 20. The quantity $[V_r]$ may be readily estimated by one skilled in the art for any given coal feed and operating temperature.

An important element of the method of this invention is the use of a fluidized bed reduction zone. Introduction of coal feed into a fluidized bed leads to rapid heating of the coal, producing a larger fraction of volatiles than would be obtained at slower heating rates encountered in fixed or moving bed systems. Moreover, coal is converted to fluid-phase products while it is in the reactive state, i.e., upon initial heating when volatiles are ejected and before the carbon skeleton is reshaped and stabilized to form less reactive char.

The space velocity of the stack gases and the residence time of the coal-derived solids in the reduction zone are regulated so that there is a sufficient time to enable the reducing components present in the zone to convert the $NO_x$ in the stack gas to nitrogen. Char residence time in the zone is increased to provide necessary mixing and contacting of the gas being treated. The coal/char residence time is within the range from about 1 minute to 2 hours, preferably from about 5 to 30 minutes. Considering the coal/char residence time and the $[V_r]/[NO_x]$ ratio discussed above, it is apparent that the fluidized solids present in the reduction zone comprise a relatively large quantity of char having a relatively small quantity of coal dispersed therein.

A problem generally encountered in fluid bed processing of coal is the fusion or agglomeration of the coal into large particles which are difficult to process. However, the relatively low quantity of coal required by the method of the present invention per volume of stack gas minimizes or eliminates this problem. Methods of coal injection to the reduction zone and the fluidization characteristics of the char/coal within the bed itself—particularly the extent of solid mixing and turbulence in the vicinity of the coal feed inlet point—are apparent to those skilled in the art. Higher fluidizing velocities are preferred. The coal is desirably maintained as a turbulent fluidized bed or a fast fluidized bed to minimize the effect of coal agglomeration tendencies. Moreover, the presence of oxygen in the reduction zone further enhances control of coal agglomeration tendencies. Coal is preferably pneumatically fed to the reduction zone through a number of suitable spaced inlet ports.

The pressure of the reduction zone is not critical to the $NO_x$ removal method of this invention but should be sufficient to avoid loss of plume buoyancy in the effluent-emitting stack. Pressures will generally range from about 20 inches of water vacuum to 20 inches of water, preferably from about 10 inches of water vacuum to about 10 inches of water. Operating at higher pressure normally requires less residence time.

The overall devolatilization-gasification-reduction reactions occurring in the zone are endothermic and hence there is a net heat consumption in the reactor. Moreover, the gases to be treated and the coal fed to the reactor may require sensible heat to bring them up to and maintain them at the reaction temperature. According to the method of this invention, auxiliary oxygen-containing gases are added to the reaction zone in an amount sufficient to maintain the desired temperature within the reduction zone. It is best to control the temperature at the $NO_x$-containing gas source so as to minimize cooling or reheating in the reaction zone and then to maintain that temperature within the reaction zone by controlling the oxygen content in the reaction zone. However, if necessary, reheating can be readily accomplished by introducing air to the fluidized bed reactor. Preferably, the free oxygen content of the fluid phase in the zone is in the range from about 0.1–3%. The oxygen content of the gas treated by the method of this invention may be sufficient to provide the desired oxygen content. However, oxygen is consumed in the reduction zone and the addition of additional oxygen-containing gas (e.g., air) may be necessary.

Referring now to the figure, the method of this invention will be described with reference to a stationary coal combustion source. Feed coal introduced via line 1 is first pulverized in pulverizer 10 to reduce the coal to a particle size within the range from about 50 to 300 meshes. Preferably the particle size distribution is such that 50% of the coal particles will pass through a 100 mesh screen. The pulverized coal 12 is then split into two streams: a relatively large stream which passes through line 13 to stationary combustion source 20 and a relatively small stream which passes through line 17 to the fluidized-bed, $NO_x$ reduction zone 30. The split of the pulverized coal stream 12 is determined by the $NO_x$ reduction requirements of the reduction zone 30 which requirements are in turn dependent on the $NO_x$ content of stack gas 25 passing from the stationary combustion source 20 and on the volatile content of the coal as described above. The split stream 17 of coal passing to the reduction zone 30 is generally within the range from about 0.01 to about 5 weight percent of the total coal fed to the combustion source 20. The operation of the combustion source 20 is not a part of this invention. However, it is desirable to operate the combustion source 20 so that the temperature of the stack gas 25 is approximately the same temperature as that of the reduction zone 30 in order to eliminate the need for heat transfer between the combustion source 20 and the reduction zone 30.

The stack gas passing through line 25 fluidizes the bed of pulverized coal/char present in the reduction zone 30 and is maintained therein for a sufficient time to substantially reduce the $NO_x$ content of the stack gas 25. $NO_x$ reductions on the order of 60 to 90% are obtainable in reduction zone 30. A portion of the solids phase (i.e., char and ash) is continuously removed from reduction zone 30 by means well known in the art (e.g., cyclones). The separated solids phase comprising char and ash passes through line 32 to combine with pulverized coal which is introduced by line 13 to combustion source 20. Pulverized coal is added through line 17 to reduction zone 30 in an amount sufficient to maintain the [VR]/[$NO_x$] mole ratio within the range from about 5 to 20. Although the FIGURE does not show this, it is preferred that at least a portion of the stack gas 25 is employed to pneumatically convey the pulverized coal in line 17 to reduction zone 30. Auxiliary air is added to reduction zone 30 through line 34 as necessary to maintain the temperature in the fluidized bed reduction zone 30 within the range from about 500°–650° C.

The treated stack gas passing from reduction zone 30 via line 34 contains a variety of constituents including coal volatiles, nitrogen, hydrogen and carbon monoxide. Sulfur contaminants such as hydrogen sulfide and sulfur dioxide may also be present. According to the method of this invention, auxiliary oxygen-containing gas (e.g., air) is added to the treated stack gas 34 via line 38 to convert the oxidizable contaminants present in the treated stack gas 34 to less objectionable materials. Conversion of oxidizable objectionable constituents such as coal volatiles (phenols and tars), hydrogen and carbon monoxide to less objectionable products of complete combustion is possible without significant reformation of $NO_x$ impurities in the effluent stack gas 42 because this process employs temperatures well below those favoring nitrogen oxidation. Temperature control of the combined treated stack gas/auxiliary air stream 39 and heat recovery from the combined gas stream 39 is accomplished by heat exchanger means 40 which may be any indirect heat exchange apparatus known in the art.

The quantity of auxiliary oxygen-containing gas added to the treated stack gas should be sufficient to provide a slight stoichiometric excess of oxygen (i.e., about 5 to 20%) relative to the oxidizable, objectionable constituents present in the treated stack gas. The temperature will generally be equal to or higher than that of the reduction zone 30 and be within the range from about 650° to 800° C.

This invention is primarily concerned with the removal of $NO_x$ from stack gases and it is most desirably applied to stack gases produced by the combustion of low-sulfur fuels such as desulfurized coal or solvent refined coal. However, if stack gas is produced by the combustion of a sulfur-containing fuel such as coal, sulfur contaminants present therein will be oxidized to $SO_2$ in the heat recovery unit of this invention. If necessary, the oxidized, treated stack gas 42 passing from heat exchanger 40 may be further treated to remove $SO_2$ by methods well known in the art. For example, see Rosenberg, H.S., et al., "The Status of $SO_2$ Control Systems," Chem. Eng. Prog., Vol. 71, No. 5, pp. 66–71 (May, 1975), the entire content of which is hereby incorporated by reference.

The undesirable production of COS is a major problem encountered in known dry-contact methods for removal of $NO_x$ and/or $SO_x$ contaminants from stack gas. However, the relatively low reduction temperatures and the "secondary oxidation" step following the $NO_x$ reduction step of the present invention minimizes or eliminates carbonyl sulfide in the effluent stack gas.

What is claimed is:

1. A noncatalytic, dry contact reduction method for removing nitrogen oxides from gaseous mixtures containing $NO_x$ impurities which comprises introducing the gaseous mixture and an effective amount of coal having a volatile content of at least about 15 weight percent into a fluidized bed reduction zone at a temperature within the range from about 400° to 700° C. and maintaining the gaseous mixture therein for a time sufficient to substantially reduce the $NO_x$ to molecular nitrogen.

2. A noncatalytic, dry-contact reduction method for removing nitrogen oxides from gaseous mixtures containing $NO_x$ impurities which comprises:
   (a) introducing an effective amount of coal having a volatile content of at least about 15 weight percent and the gaseous mixture into a fluidized bed reduction zone;
   (b) maintaining the fluidized bed reduction zone at a temperature within the range from about 400° to 700° C., thereby producing $NO_x$ reducing agents comprising fluid phase coal devolatilization/gasification products, substantially reducing the nitrogen oxides in the gaseous mixture, and forming a treated gaseous mixture containing oxidizable products and a solids phase comprising coal char and ash;
   (c) separating the solids phase from the treated gaseous mixture containing oxidizable products;
   (d) adding sufficient oxygen-containing gas to the treated gaseous mixture in a second zone to convert substantially all of the oxidizable products to carbon dioxide and water without reformation of nitrogen oxides; and
   (e) venting the resulting gas.

3. The process of claim 2 whereby heat is recovered from the gaseous mixture in the second zone by heat exchange means.

4. The process of claim 3 wherein the temperature of the second zone is maintained within the range from about 650° to 800° C.

5. The process of claim 2 wherein the quantity of oxygen-containing gas added in the second zone provides a stoichiometric excess of oxygen relative to the oxidizable products in the range from about 5 to 20%.

6. The process of claim 2 wherein gaseous mixtures containing $NO_x$ impurities are generated by stationary combustion sources burning pulverized coal having a volatile content of at least about 15 weight percent, the coal introduced into the fluidized bed reduction zone is a split stream of the stationary combustion source feed coal, and the solids phase separated from the treated gaseous mixture containing oxidizable products is combined with the coal fed to the stationary combustion source.

7. The process of claim 6 wherein the split stream of coal introduced into the fluidized bed reduction zone is from about 0.01 to 5 weight percent of the coal fed to the stationary combustion source.

8. In the process of claim 2 wherein the gaseous mixture containing $NO_x$ impurities also contains sulfur contaminants which are oxidized to $SO_2$ in the second zone, the further step comprising removing $SO_2$ from the resulting gas and venting the resultant gas product.

9. A process according to claims 1 or 2 wherein the quantity of coal introduced to the reduction zone is sufficient to maintain a $[V_r]/[NO_x]$ mole ratio within the range from about 1 to 100.

10. A process according to claims 1 or 2 wherein the quantity of coal introduced to the reduction zone is sufficient to maintain a $[V_r]/[NO_x]$ mole ratio within the range from about 5 to 20.

11. A process according to claims 1 or 2 wherein the temperature of the fluidized bed reduction zone is within the range from about 500° to 650° C.

12. A process according to claims 1 or 2 wherein an oxygen-containing gas is added to the fluidized bed reduction zone to maintain the desired temperature.

13. A process according to claim 1 or 2 wherein the residence time of the coal/char present in the fluidized bed reduction zone is within the range from about 1 minute to 2 hours.

14. A process according to claim 1 or 2 wherein the residence time of the coal/char present in the fluidized bed reduction zone is within the range from about 5 to 30 minutes.

* * * * *